US007384226B2

(12) United States Patent
Jones et al.

(10) Patent No.: US 7,384,226 B2
(45) Date of Patent: Jun. 10, 2008

(54) BLIND FASTENER

(75) Inventors: Steven V. Jones, Birmingham (GB);
Geoffrey Weeks, Burton-upon-Trent (GB)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/825,028

(22) Filed: Apr. 15, 2004

(65) Prior Publication Data
US 2004/0228706 A1    Nov. 18, 2004

(30) Foreign Application Priority Data
May 13, 2003    (GB)    .................... 0310930.3

(51) Int. Cl.
F16B 19/00    (2006.01)
F16B 19/08    (2006.01)
F16B 13/04    (2006.01)
(52) U.S. Cl. .................. 411/508; 411/43; 411/60.1; 411/501; 411/509; 411/903
(58) Field of Classification Search ........... 411/43, 411/60.1, 500–508, 903; 16/86 R
See application file for complete search history.

(56) References Cited

U.S. PATENT DOCUMENTS

| 346,476 | A | * | 8/1886 | Henius | 411/504 |
| 422,824 | A | * | 3/1890 | Peck | 411/501 |
| 483,806 | A | * | 10/1892 | Hull | 174/138 D |
| 918,060 | A | * | 4/1909 | Kabureck | 16/86 R |
| 1,533,687 | A | * | 4/1925 | Beck et al. | 16/86 R |
| 1,915,249 | A | * | 6/1933 | Jorgensen | 248/345.1 |
| 2,040,939 | A | * | 5/1936 | Huck | 470/29 |
| 2,367,657 | A | * | 1/1945 | Boersma | 52/511 |

(Continued)

FOREIGN PATENT DOCUMENTS

DE    20121589 U    2/2003

(Continued)

OTHER PUBLICATIONS

Website: http://www.machinist-materials.com/hardness.htm shows hardness scale tables and material hardnesses.*
Catalog page entitled: Special Blind Rivets.

*Primary Examiner*—Katherine W Mitchell
(74) *Attorney, Agent, or Firm*—Harness, Dickey & Pierce, P.L.C.

(57) ABSTRACT

The present invention is directed to a blind fastener, usually a blind rivet, (10) comprising a mandrel (22) and an elongate cylindrical body (16) mounted on a stem (24) of such mandrel so as to extend co-axially about a central axis A of such blind rivet, the body (16) having a flange (18) at one end and a tail end (20) at an axially opposed end, for insertion through a hole in a workpiece, the mandrel having a mandrel head (26) in operative engagement with this tail end (20) for transmitting force thereto during setting of such fastener, wherein the body (16) has two different external diameters (d, D) and a radially extending shoulder (32) therebetween such that the external diameter (D) of the body adjacent to the flange (18) is greater than the external diameter (d) of the body adjacent to the tail end, wherein the body between this shoulder (32) and the flange is at least partially encased in a resilient, shock absorbing material (36).

12 Claims, 1 Drawing Sheet

U.S. PATENT DOCUMENTS

Figure 1:
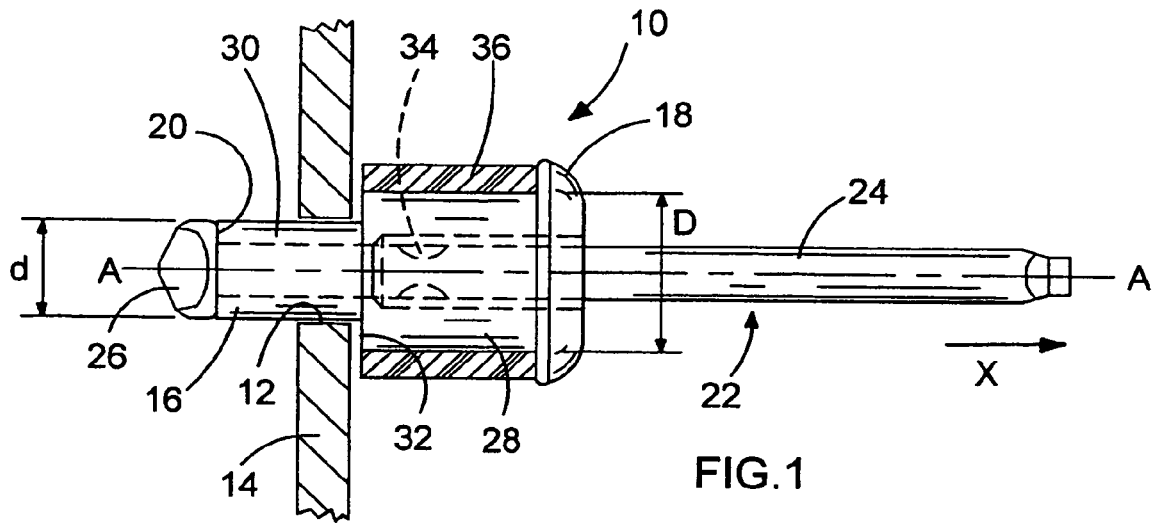

| | | | | |
|---|---|---|---|---|
| 2,456,118 | A | * | 12/1948 | Foster .................... 174/153 R |
| 2,562,336 | A | * | 7/1951 | Selden ........................ 411/501 |
| 2,596,780 | A | * | 5/1952 | Meyers et al. .............. 267/140 |
| 2,735,673 | A | * | 2/1956 | Muller ........................ 267/292 |
| 2,759,082 | A | * | 8/1956 | Rea ........................ 219/150 R |
| 2,813,712 | A | * | 11/1957 | Stanis ........................ 267/257 |
| 2,921,819 | A | * | 1/1960 | Ritkin ........................ 384/439 |
| 3,300,798 | A | * | 1/1967 | York .............................. 470/2 |
| 3,328,061 | A | * | 6/1967 | Whistler, Sr. et al. ........ 292/76 |
| 3,452,638 | A | | 7/1969 | Lauer |
| 3,491,649 | A | * | 1/1970 | Smouton et al. .............. 411/43 |
| 3,505,923 | A | * | 4/1970 | Neill ........................ 411/501 |
| 3,553,040 | A | * | 1/1971 | Bell ........................ 216/102 |
| 3,747,466 | A | * | 7/1973 | Rosman ........................ 411/361 |
| 3,921,777 | A | * | 11/1975 | Rist ........................ 192/107 C |
| 4,039,099 | A | * | 8/1977 | Boxall ........................ 220/773 |
| 4,074,608 | A | * | 2/1978 | Siebol ........................ 411/43 |
| 4,104,952 | A | * | 8/1978 | Brass ........................ 411/500 |
| 4,112,993 | A | * | 9/1978 | Dey .............................. 16/2.1 |
| 4,164,807 | A | * | 8/1979 | King, Jr. ...................... 29/523 |
| 4,170,919 | A | * | 10/1979 | Siebol ........................ 411/43 |
| 4,170,920 | A | * | 10/1979 | Siebol ........................ 411/43 |
| 4,202,243 | A | * | 5/1980 | Leonhardt .................... 411/501 |
| 4,236,429 | A | * | 12/1980 | Dolch ........................ 411/41 |
| 4,261,245 | A | * | 4/1981 | Mauer ........................ 411/43 |
| 4,301,629 | A | * | 11/1981 | Farr .............................. 52/99 |
| 4,363,580 | A | * | 12/1982 | Bell ........................ 411/15 |
| 4,452,556 | A | * | 6/1984 | Nelson et al. .............. 411/377 |
| 4,478,544 | A | * | 10/1984 | Strand ........................ 411/34 |
| 4,497,603 | A | * | 2/1985 | Boucher et al. .............. 411/34 |
| 4,521,147 | A | * | 6/1985 | King et al. .................... 411/43 |
| 4,580,936 | A | * | 4/1986 | Francis et al. ................. 411/38 |
| 4,585,383 | A | * | 4/1986 | Kraemer ........................ 411/38 |
| 4,609,315 | A | * | 9/1986 | Briles ........................ 411/43 |
| 4,639,175 | A | * | 1/1987 | Wollar ........................ 411/38 |
| 4,687,394 | A | * | 8/1987 | Berecz ........................ 411/361 |
| 4,687,397 | A | * | 8/1987 | Berecz ........................ 411/503 |
| 4,687,398 | A | * | 8/1987 | Berecz ........................ 411/503 |
| 4,696,610 | A | * | 9/1987 | Wright ........................ 411/38 |
| 4,776,737 | A | * | 10/1988 | Wollar ........................ 411/38 |
| 4,813,833 | A | * | 3/1989 | Haab ........................ 411/188 |
| 4,840,075 | A | * | 6/1989 | Tucker ........................ 74/89.14 |
| 4,840,522 | A | * | 6/1989 | Kurihara ........................ 411/44 |
| 4,863,330 | A | * | 9/1989 | Olez et al. ................... 411/424 |
| 4,865,792 | A | * | 9/1989 | Moyer ........................ 264/249 |
| 4,894,902 | A | * | 1/1990 | Tucker ........................ 29/437 |
| 4,921,371 | A | * | 5/1990 | Boiraeu et al. .......... 403/408.1 |
| 4,949,450 | A | * | 8/1990 | Scharres ...................... 29/523 |
| 4,975,008 | A | * | 12/1990 | Wagner ........................ 411/337 |
| 4,985,979 | A | * | 1/1991 | Speakman .................... 29/512 |
| 4,987,714 | A | * | 1/1991 | Lemke ........................ 52/410 |
| 5,009,557 | A | * | 4/1991 | Dessirier .................... 411/504 |
| 5,015,136 | A | * | 5/1991 | Vetter et al. ................. 411/504 |
| 5,018,920 | A | * | 5/1991 | Speakman .................... 411/43 |
| 5,092,550 | A | * | 3/1992 | Bettini ........................ 248/188.4 |
| 5,103,533 | A | * | 4/1992 | Pettit et al. .................... 16/342 |
| 5,314,280 | A | * | 5/1994 | Gagliardi et al. ........... 411/182 |
| 5,320,465 | A | * | 6/1994 | Smith ........................ 411/43 |
| 5,345,734 | A | * | 9/1994 | Tremblay ................. 52/204.52 |
| 5,447,399 | A | * | 9/1995 | Yoshida et al. .............. 411/383 |
| 5,467,503 | A | * | 11/1995 | Nolte et al. .................... 16/429 |
| 5,482,348 | A | * | 1/1996 | Mass et al. .................... 296/207 |
| 5,553,962 | A | * | 9/1996 | Eustache .................... 403/154 |
| 5,569,005 | A | * | 10/1996 | Millington .................... 411/34 |
| 5,581,867 | A | * | 12/1996 | Gaquere .................. 29/525.06 |
| 5,735,511 | A | * | 4/1998 | Stocker et al. ......... 267/140.13 |
| 5,826,376 | A | * | 10/1998 | Yamamoto et al. ........... 49/350 |
| 5,848,801 | A | * | 12/1998 | Hirt .......................... 280/731 |
| 5,915,901 | A | * | 6/1999 | Aasgaard .................... 411/29 |
| 5,922,472 | A | * | 7/1999 | Keener .................... 428/472.2 |
| 5,944,918 | A | * | 8/1999 | Keener .................... 148/251 |
| 6,065,186 | A | * | 5/2000 | Jermyn, Jr. ................. 16/86 R |
| 6,183,179 | B1 | * | 2/2001 | Gaquere ...................... 411/43 |
| 6,238,127 | B1 | * | 5/2001 | Jhumra et al. .............. 403/282 |
| 6,295,697 | B1 | * | 10/2001 | Simon ........................ 16/86 R |
| 6,336,245 | B1 | * | 1/2002 | Sakakibara ...................... 16/82 |
| 6,361,239 | B1 | * | 3/2002 | Parikh et al. ............... 403/282 |
| 6,499,926 | B2 | * | 12/2002 | Keener ........................ 411/504 |
| 6,507,976 | B2 | * | 1/2003 | Ichimaru ...................... 16/82 |
| 6,607,328 | B1 | * | 8/2003 | Treiber et al. ........... 403/408.1 |
| 6,607,339 | B1 | * | 8/2003 | Mangapora .................. 411/107 |
| 6,632,056 | B1 | * | 10/2003 | Lind ........................ 411/107 |
| 6,749,384 | B1 | * | 6/2004 | Ellis ........................ 411/45 |
| 6,857,166 | B2 | * | 2/2005 | Nakagaki et al. ........... 16/86 R |
| 6,926,265 | B1 | * | 8/2005 | Elliott ........................ 267/140 |
| 7,114,217 | B2 | * | 10/2006 | Matsuzawa et al. ........... 16/2.2 |
| 7,168,130 | B2 | * | 1/2007 | Shin ........................ 16/82 |
| 7,182,561 | B2 | * | 2/2007 | Jones ........................ 411/43 |
| 2002/0119025 | A1 | * | 8/2002 | Wirth et al. .................... 411/43 |
| 2003/0088940 | A1 | * | 5/2003 | Nakagaki et al. ........... 16/86 R |
| 2003/0147718 | A1 | * | 8/2003 | McDowell et al. ......... 411/396 |
| 2004/0047704 | A1 | * | 3/2004 | Wirth et al. .................... 411/43 |
| 2004/0228706 | A1 | * | 11/2004 | Jones et al. ................. 411/501 |
| 2005/0019136 | A1 | * | 1/2005 | Jones ........................ 411/501 |
| 2005/0204507 | A1 | * | 9/2005 | Huang ........................ 16/86 R |

FOREIGN PATENT DOCUMENTS

| | | |
|---|---|---|
| EP | 0 556 993 A1 | 8/1993 |
| EP | 0 945 631 A2 | 9/1999 |
| GB | 2302148 A | 1/1997 |
| GB | 2381301 A | 4/2003 |

* cited by examiner

BLIND FASTENER

BACKGROUND OF THE INVENTION

The present invention relates to tubular blind fasteners of the type that can be inserted through a pre-formed hole in a workpiece and secured therein by a setting operation carried out from one side of such workpiece. More particularly, this invention is directed to a blind fastener utilising a pull mandrel to effect the setting operation and which further has shock absorbing properties.

Many conventional assemblies, across through many different industries, utilise end-stops defining the limit of movement of particular slidable members. One example of such a stop member is an end-stop for sliding drawers in cabinets, desks and domestic cooker trays. Additionally, within the motor industry, it is known that the plastic carrier part of an electric window assembly (the carrier part that supports and carries the glass in a window winder application) travels along an appropriate metal track that acts as a guide for such carrier. The movement of the plastic glass carrier is usually achieved by means of an electrical motor whereby, commencing with the car window in an open position, the electrical motor upon operation causes the glass carrier to move upwardly to close the window at the top of the door. It is the action of the glass closing at the top of the door and encountering the doorframe that creates an electrical overload thus causing the motor to switch off. However, in the case of convertible vehicles, the car door does not have a top to the doorframe which can be used to provide a means of arresting the upward movement of the glass carrier. Therefore, a solid metal stop is provided in the metal rail along which the glass carrier travels to act as a stop means by physically engaging the plastic carrier. Obviously, plastic stop members or other resilient stop members would be too weak to withstand the overloading forces of the electrical motor commonly employed in electrical window winder designs and would fail to meet its objective. Therefore, rigid metal barriers are employed to achieve this function. However, the contact of the hard plastic of the carrier with the rigid metal stop creates a relatively large noise which, in today's automobile industry, is deemed unacceptable. Attempts to solve this problem by incorporating a soft pad to the glass carrier have proven to be expensive and not entirely satisfactory. Also, since the applied load of the glass carrier on this stop is substantial and applied at a distance from the stop securing point, there is created a relatively large pivotal force to be applied to the stop securing point which has a tendency to cause the stop to be torn from the metal rail. In addition, the cost of assembling a metal stop on such rail by welding or bolted fixings is relatively expensive and time consuming, particularly where significant volumes are required and access is necessitated to both sides of the rail, which has limiting design disadvantages in some designs of window winders.

It is therefore an object of the present invention to provide a blind fastener which can be used as an appropriate stop for arresting displacement of slidable members and which alleviates the aforementioned problems of existing stops, particularly those associated with window winders.

SUMMARY OF THE PRESENT INVENTION

According to the present invention there is now provided a blind fastener comprising a mandrel and an elongate cylindrical body mounted on an elongate stem of this mandrel so as to extend co-axially about a central axis of the blind fastener; the body having a pre-formed, radially enlarged, flange at one end thereof and a tail end at the opposite end for insertion through a hole in a workpiece; the mandrel having a mandrel head in operative engagement with the tail end of the fastener for transmitting force thereto during setting of the fastener, characterised in that the body having two different, uniform, external diameters and a radially extending shoulder therebetween, such that the external diameter of the body adjacent to the flange is greater than the external diameter of the body adjacent to the tail end and the body between the shoulder and the flange is at least partially encased in a resilient material, which resilient material will usually be a plastic or rubber material. In particular, the use of this resilient material provides a shock absorbing function so that any rigid body contacting it causes deformation of the resilient material causing such material to be displaced both circumferentially and longitudinally about the body, thereby retarding impact as opposed to the previously associated abrupt stop, thereby eliminating the noise of impact but also absorbing some of the load transferred from the displaceable member thereby reducing the load applied to the mounting connection of the blind fastener.

It is preferred that the body between the shoulder and the flange will be completely enclosed in a cylindrical sleeve of the resilient material, which sleeve usually having an external diameter equal to or less than the outer diameter of the flange. The flange serves to maintain the sleeve on the rivet body following setting of the blind fastener.

It is preferred that the external diameter of the body adjacent to the flange will be at least 1.4 times the external diameter of the body adjacent to the tail end.

In addition, it is usual that the shoulder should extend substantially perpendicular to the central axis of the fastener, although it may be inclined thereto if appropriate. This shoulder will normally be positioned at a distance of between 25% and 75% of the length of the body remote from the flange and preferably between 40% and 60%.

It is preferred that the resilient material will have a hardness of between 50 and 80 shore hardness and preferably between 60 and 70 shore hardness. The durometer reading is based on the Shore A scale. It is usual that the blind fastener will either comprise a closed end or an open end blind rivet, usually manufactured from metal such as aluminum or steel.

BRIEF DESCRIPTION OF THE ACCOMPANYING DRAWINGS

Figure 2:
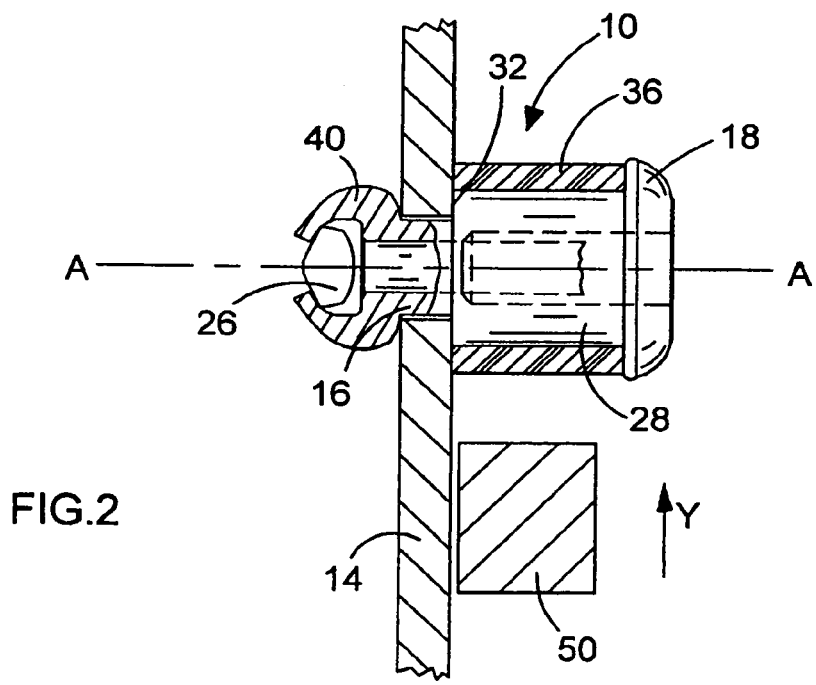

A preferred embodiment of the present invention will now be described, by way of example only, with reference to the accompanying illustrative figures in which:

FIG. 1 is a cross sectional view of a blind fastener according to the present invention prior to setting; and FIG. 2 is a cross sectional view of the blind fastener of FIG. 1 in a set configuration.

DETAILED DESCRIPTION OF THE PREFERRED EMBODIMENT

Referring now to FIG. 1, there is shown a shock absorbing blind rivet (10) comprising a conventional open end blind rivet operational structure. This blind rivet (10) is illustrated inserted through a pre-formed hole (12) in a specific workpiece (14) which, in this specific embodiment will comprise a metal track of a window winder construction for a motor vehicle. The rivet (10) is shown prior to undertaking a blind rivet setting operation.

The blind rivet (10) comprises an elongate, substantially tubular (or cylindrical), rivet body (16) having an enlarged radially extending flange (18) disposed at one end of the rivet body (16). As is conventional, the flange (18) forms a shoulder extending substantially perpendicular to a central axis A of the blind rivet assembly (10). The remote tail end (20) of the rivet body (16), axially opposed to the flange (18), has a substantially flat end face extending substantially perpendicular to the rivet axis (A).

As is conventional for blind rivets, the rivet (10) is further provided with a mandrel (22) comprising a cylindrical mandrel stem (24) and having an enlarged mandrel head (26) at its blind end thereof which lies adjacent to the tail end (20) of the rivet body (16). The mandrel stem (24) is of substantially uniform cross sectional area along its axial length and, in this embodiment, is cylindrical having a diameter which is substantially equal to the minimum inner diameter of the tubular rivet body (16) so as to form a complimentary frictional fit therewith as will be described below. The mandrel stem further extends co-axial with the rivet axis (A).

The mandrel head (26) has a maximum outer diameter extending co-axial with the rivet axis (A) which is greater than the mandrel stem diameter.

The current design of tubular rivet body (16) varies from a conventional blind rivet body in that it is provided with two distinct sections having different external diameters. A front end portion (28) of the rivet body (16), adjacent to and extending rearwardly from the flange (18) has a first uniform diameter (D). The rear end portion (30) of the rivet body (16), adjacent to and extending forwardly from the remote tail end (20) of the rivet body (16), has a second uniform diameter (d), which diameter (d) being less than the diameter (D) of the front end portion (28). The rivet body is therefore provided with a substantially radially extending shoulder (32) extending between two external diameters of the front end and rear end portions as shown in FIG. 1. In this embodiment the shoulder (32) extends substantially perpendicular to the rivet body axis (A) but could be inclined relative thereto if required. It is preferred that the external diameter (D) of the front end portion is at least 1.2 times greater than the external diameter d of the rear end portion and will usually be in the range of 1.4 to 1.8 times greater. However, there is no effective upper limit to this ratio, other than practical manufacturing constraints.

In operation, the shoulder (32), disposed between the two different distinct diameters (d) and (D), serves the same functional purpose of the flange portion of a conventional blind rivet in that it will form a workpiece engaging surface as shown in FIG. 1. Here, the pre-formed hole (12) formed in the workpiece (14) is of a diameter sufficient to allow the rear end portion (30) of the rivet body to pass therethrough, while being less than the diameter (D) of the front end portion such that the shoulder (32) therebefore abuts with the workpiece (14) as the rivet body is inserted therethrough. In this manner, the rear end portion (30) of the rivet (10) acts as a conventional blind rivet having an internal diameter substantially equal to the external diameter of the mandrel stem (24) to effect frictional engagement therewith. The diameter of the mandrel head (26), as is conventional, is then designed to be within the optimum of 4% to 9% greater than the external diameter (d) of this rear end portion (30) of the rivet body (16) so as to engage with the tail end (20) of the rivet body in a conventional manner.

In this embodiment, the manufacturing process has effected enlargement of a uniform tubular rivet body to form the front end portion having a greater diameter (D) by partially expanding a hollow tube of uniform thickness and diameter. Thus the internal diameter of the front end portion (28) is greater than that of the rear end portion (30) so that the mandrel stem does not frictionally engage with the inner surface of the front end portion. However, it will be appreciated that the internal diameter of the entire rivet body may be uniformed so as to effect frictional engagement along its entire length if so required. Also, as shown in hashed lines in FIG. 1, the mandrel stem is provided with a conventional reduced diameter break neck portion (34).

For the specific purposes of achieving a shock absorbing function, the front end portion (28) of the rivet body (16) is, in this embodiment provided with a cylindrical sleeve (36) of a resiliently deformable material such as a soft plastic material, an elastomeric compound or of a silicone based rubber compound. The sleeve (36) will preferably have a hardness of between 50 and 80 shore hardness and ideally between 60 and 70 shore. The durometer reading is based on the Shore A scale. The sleeve (36) has an outer diameter of between 90% and 99% the external diameter of the flange (18) (although if so required could have a greater external diameter). Here, the flange (18) serves as an end stop to retain the sleeve from being displaced away from the rivet (10) once set (as shown in FIG. 2) and thus requires sufficient overlap to achieve this function. The inner diameter of the sleeve (36) corresponds to the outer diameter D of the front end portion (28) so as to be frictionally received thereon. This sleeve (36) can be pre-formed and simply slidably received onto the rivet body (16) or can be moulded directly thereto if so required. Although not shown, the front end portion (28) of the rivet body could be provided with a series of indents or projections to enhance an attachment of this sleeve thereon, whether it be slidably received or whether it is directly moulded thereto.

In operation, the blind rivet (10) will be set by use of conventional blind rivet setting tools. The blind rivet is inserted from one side of a workpiece, as shown in FIG. 1 until it's shoulder portion (32) engages with such workpiece whereby conventional rivet setting tools will then be employed, whereby a nose portion of the setting tool will engage the flange (18) to maintain the shoulder (32) in abutment with the workpiece (14) as a displacement force (X) is then applied to the mandrel stem (24) which will, as is conventional, draw the mandrel head (26) into engagement with the flat surface of the tail end portion (20) so as to compress the rivet body (16) towards the rivet flange (18). Such compression of the rivet body results in radial expansion of the compressed (reduced length) rear end portion (30) of the rivet body so as to form an enlarged deformed rivet head (40) as shown in FIG. 2. This enlarged rivet head will have a diameter greater than that of the pre-formed hole (12) and will serve to compress the workpiece between this head and the shoulder portion (32). Continued application of the axial setting force (X) results in an increased resistance force encountered by the mandrel head (26) as it encounters the workpiece (14) which subsequently prevents further displacement of the mandrel head. Setting force (X) increases the stress of the mandrel stem in a conventional manner until failure of the mandrel stem (24) at its neck portion (34). In this embodiment, the mandrel head (26) is drawn into the deformed portion of the rivet head (40) and is retained there following the setting operation. Thus, the rivet (10) is secured to the workpiece (14) as shown substantially in FIG. 2 such that the front end portion (28) projects externally of this workpiece and whereby the resilient sleeve (36) is then maintained on this front end portion

(28) between the workpiece (14) and the shoulder formed between the flange (18) and the body (16).

As previously discussed, one of the primary uses of this type of shock absorbing blind rivet (10) is to act as an end stop against which a moveable object can abut to limit its continued displacement. One of its primary uses will be to provide an end stop to a plastic carrier part carrying a glass window in a window winder application in motor vehicles. This plastic part is schematically illustrated as item (50) in FIG. 2 and its movement towards the rivet (10) (acting as an end stop) is illustrated by arrow y.

As the plastic part (50) is driven into engagement with the stop (10) it impacts onto the resiliently deformable sleeve (36) which serves a dual purpose of, firstly eliminating impact noise since the impact load is absorbed over a relatively longer period of time due to the cushioning effect and deformation of the sleeve (36), such that the sleeve (36) helps retard rather than abruptly stop the forward motion of this carrier part (50), thereby eliminating impact noise. Secondly, since this sleeve (36) cushions the impact load as the sleeve distorts both radially and longitudinally about the rivet axis (A) some of the impact load is absorbed within the sleeve itself and thus serves to reduce the impact load applied to the fixing point of the rivet (10) to the workpiece (14). Since the impact loads imparted by the carrier (50) are relatively high, it will be appreciated that the stress exerted on an end stop is considerable, and any form of reduction of this impact load will have a significant benefit on the life expectancy of such fixings. Furthermore, the use of a blind rivet to form such an end stop has a considerable advantage in that its metallic construction and securement to both sides of the workpiece further strengthens such fixing. Also, the use of a blind rivet as previously described, simply requires access to the workpiece (14) (such as a carrier rail) from one side only, thereby offering considerable benefits in manufacturing costs and time (especially when compared to effecting a fixing requiring attachment from both sides of the workpiece, often necessitating re-design of the rail and window winder construction to allow such access).

While it is preferred that the shock absorbing blind rivet (10) herein described is intended for use with an automobile window winder construction, it can also be applied to any other form of end stop required for fixing to a workpiece or rail in other sliding assemblies such as drawers etc.

A further advantage of the present invention is that there is no limit to the diameter (D) of the front end portion (28), whereby the greater the relative ratio between this diameter (D) and the diameter (d) of the rear end portion (30) creates a shoulder (32) having a greater cross sectional area, whereby the greater such cross sectional area of the shoulder (32) will further help distribute load over greater surface area of the workpiece, thus further reducing stress transferred to this attachment point during impact and again minimising the risk of damage to such connection due to the high impact loads imparted by the carrier (50). Furthermore, the thickness of the sleeve (36) can be varied so as to provide a greater cushioning effect if so required to further reduce load transfer from the impact load of the carrier (50).

In addition, while the resilient material used in the present embodiment comprises a cylindrical sleeve (36), the carrier (50) will only impact the stop (rivet (10)) in one direction and thus the sleeve (36) could be replaced by a resilient pad extending only partway about the circumference of this front end portion (28), such pad being adhesively or mechanically secured thereto as appropriate. Alternatively, instead of a uniform axially extending sleeve (36) a plurality of circumferential rings of resilient material could alternatively be employed, each of which, on compression by the impact force imparted by the carrier (50) could then be deformed into gaps between adjacent rings to help further distribute the load. Alternatively, the sleeve (36), instead of having a uniform outer surface could be provided with a series of circumferential ridges and grooves to achieve a similar function.

While the present embodiment comprises a conventional open end blind rivet, the specific form and operation of the blind rivet is not so limited. The current invention could be applied to any type of existing and known blind rivet operation, including a closed end blind rivet, or alternatively a blind rivet whereby engagement between the mandrel and the rivet body is achieved by an internal screw threaded arrangement as opposed to use of a mandrel head. The invention is also applicable to self piercing blind rivets and peel type blind rivets.

The relative axially extending lengths of the front end portion (28) and the rear end portion (30) of the blind rivet are adjustable, dependent on the specific requirements. The length of the rear end portion (30) is controlled by conventional blind rivet designs so as to achieve an appropriate setting operation whereby the length of the front end portion will be determined by the required stop engagement capability. However, it is preferred that the shoulder (32) extending between these two portions of the rivet body should be positioned so as to be between 25% and 75% of the length of the body remote from the flange (18).

What is claimed is:

1. A blind fastener comprising:
    a mandrel and a monolithic cylindrical body mounted on an elongate stem of said mandrel so as to extend co-axially about a central axis of said blind fastener;
    said body having a pre-formed radially enlarged flange at one end thereof and a tail end at the opposite end for insertion through a hole in a work piece having an outer surface;
    said mandrel having a mandrel head in operative engagement with said tail end of said fastener for transmitting force thereto during setting of said fastener,
    said body, annularly disposed about the mandrel, having first and second generally cylindrical portions, each having differing uniform external diameters and a radially extending shoulder therebetween, such that the external diameter of the second portion adjacent the flange is greater than the external diameter of the first portion adjacent the tail end and said body between said shoulder; and
    a sleeve of resilient material disposed about the second portion, wherein said radially extending shoulder contacts said outer surface of said work piece and said shoulder is configured to bear against a portion of the outer surface, and whereby after said setting of said fastener said first portion is deformed and said sleeve of resilient material remains exposed beyond said outer surface for providing a stop surface, and said sleeve of resilient material defines an inner surface which is in uninterrupted contact with and covers only the entire second portion between an exterior surface of the work piece and the flange.

2. A blind fastener as claimed in claim 1, wherein said sleeve of resilient material disposed about the second portion is cylindrical.

3. A blind fastener as claimed in claim 2, wherein said cylindrical sleeve of resilient material has an external diameter equal to or less than the outer diameter of said flange.

4. The blind fastener of claim 1, wherein the external diameter of said body adjacent said flange is at least 1.4 times the external diameter of the body adjacent said tail end.

5. The blind fastener of claim 1, wherein said shoulder extends perpendicular to said central axis.

6. The blind fastener of claim 1, wherein said shoulder is positioned between 25% and 75% of the length of said body remote from said flange.

7. The blind fastener of claim 1, wherein the resilient material has a hardness of between 50 and 80 shore A hardness.

8. The blind fastener of claim 7, wherein the resilient material has a hardness of between 60 and 70 shore A hardness.

9. The blind fastener of claim 1, wherein the resilient material is plastic.

10. The blind fastener of claim 1, wherein an end of the body opposite the flange end is open.

11. The blind fastener of claim 1, wherein the resilient material is rubber.

12. A blind rivet assembly comprising:

a work piece defining an opening, the work piece having a first bearing surface adjacent to the opening and a second bearing surface obverse the first bearing surface;

a rivet body having a first portion having a cylindrical surface and a second portion having a second cylindrical surface, and a shoulder disposed there between, said shoulder being generally perpendicular to the first and second cylindrical surfaces;

a flange integrally formed on a second portion; and a sleeve of resilient material disposed about the second cylindrical surface, said sleeve having a terminal end adjacent the shoulder; wherein in a set configuration, the shoulder engages the first bearing surface and the sleeve of material defines an inner surface which is in uninterrupted contact with and covers the entire second portion between the work piece and the flange, and wherein the first portion is deformable to engage the second bearing surface, said second portion remaining undeformed when the rivet is in the set configuration.

* * * * *